United States Patent [19]

Jacobson

[11] Patent Number: 5,476,613
[45] Date of Patent: Dec. 19, 1995

[54] ELECTROCONDUCTIVE MATERIAL AND PROCESS

[75] Inventor: Howard W. Jacobson, Wilmington, Del.

[73] Assignee: E. I. du Pont de Nemours and Company, Wilmington, Del.

[21] Appl. No.: 218,874

[22] Filed: Mar. 25, 1994

Related U.S. Application Data

[63] Continuation of Ser. No. 905,980, Jun. 29, 1992, abandoned.

[51] Int. Cl.$^6$ ............................ C01B 33/32; C01B 33/24
[52] U.S. Cl. ..................... 252/518; 252/500; 252/512; 252/521; 106/455; 106/441; 423/89
[58] Field of Search ........................... 252/500, 512, 252/518, 521; 106/455, 441; 423/89

[56] References Cited

U.S. PATENT DOCUMENTS

| Re. 29,427 | 10/1977 | Sekine | 204/2 |
|---|---|---|---|
| 4,246,143 | 1/1981 | Sonoda et al. | 252/518 |
| 4,431,764 | 2/1984 | Yoshizumi | 524/409 |
| 4,614,669 | 9/1986 | Yannopoulos | 427/87 |
| 4,655,966 | 4/1987 | Guillaumon et al. | 252/518 |
| 4,680,225 | 7/1987 | Ogawa et al. | 428/323 |
| 4,775,412 | 10/1988 | Nishikura et al. | 75/0.5 |
| 4,803,144 | 2/1989 | Hosoi | 430/106 |
| 4,824,754 | 4/1989 | Mikami | 430/110 |
| 4,917,952 | 4/1990 | Katamoto et al. | 428/403 |
| 5,068,063 | 11/1991 | Tremper | 252/518 |
| 5,071,676 | 12/1991 | Jacobson | 427/214 |
| 5,104,583 | 4/1992 | Richardson | 252/518 |
| 5,114,756 | 5/1992 | Mirabeau et al. | 427/379 |

FOREIGN PATENT DOCUMENTS

| 0025583 | 9/1980 | European Pat. Off. . |
|---|---|---|
| 0064558 | 11/1982 | European Pat. Off. . |
| 0147213 | 7/1985 | European Pat. Off. . |
| 0359569 | 3/1990 | European Pat. Off. . |
| 0415478 | 3/1991 | European Pat. Off. . |
| 0459552 | 5/1991 | European Pat. Off. . |
| 3842330 | 6/1990 | Germany . |
| 61-063520 | 4/1986 | Japan . |
| 61-63520 | 4/1986 | Japan . |
| 61-286224 | 12/1986 | Japan . |
| 62-216105 | 9/1987 | Japan . |
| 1-111727 | 4/1989 | Japan ...................................... 427/215 |
| 2077473 | 3/1990 | Japan . |
| 0462713 | 2/1992 | Japan . |
| 2025264 | 1/1980 | United Kingdom . |
| 2025915 | 1/1980 | United Kingdom . |
| 2188313 | 9/1987 | United Kingdom . |
| 2252551 | 12/1991 | United Kingdom . |
| 2253839 | 12/1991 | United Kingdom . |

OTHER PUBLICATIONS

M. K. Paria, H. S. Maiti, Electrical Conductivity And Defect Structure Of Polycrystalline Tin Dioxide Doped With Antimony Oxide, pp. 3275–3280.

J. M. Herrmann and J. L. Portefaix, Influence Of Calcination On The Electrical Properties Of Tin–Antimony Mixed Oxide Catalysts, 1979, vol. 12, No. 1, pp. 51–56.

Z. M. Jarzebski, Physical Properties Of $SnO_2$ Materials, 1976, vol. 123, No. 7, pp. 199C–205C.

Z. M. Jarzebski, Physical Properties Of $SnO_2$ Materials, 1976, vol. 123, No. 9, pp. 299C–310C.

Z. M. Jarzebski, Physical Properties Of $SnO_2$ Materials, 1976, vol. 123, No. 10, pp. 333C–346C.

Chopra et al., Transparent Conductors–A Status Review, 1982, pp. 1–46.

"Preparation and Properties of antimony–doped $SnO_2$ films by thermal decomposition of tin 2–ethylhexanoate", Journal of Materials Science 21 (1986) pp. 2731–2734.

Copy of European Search Report Sep. 14, 1993.

*Primary Examiner*—Paul Lieberman
*Assistant Examiner*—Wyatt B. Pratt
*Attorney, Agent, or Firm*—Michael K. Boyer

[57] ABSTRACT

A process for producing crystallites comprising silica and antimony containing tin oxide. The quantity of antimony within the tin oxide can be reduced, thereby permitting production a powder which is absent a blue coloration.

14 Claims, 1 Drawing Sheet

ELECTROCONDUCTIVE MATERIAL AND PROCESS

This is a continuation of application Ser. No. 07/905,980, filed Jun. 29, 1992, now abandoned.

FIELD OF THE INVENTION

The present invention relates to an electroconductive material comprising an intimate mixture of amorphous silica and a fine crystalline antimony-containing tin oxide, and to a process for preparing the same.

BACKGROUND OF THE INVENTION

Compositions which can be used to impart electroconductive properties to thin films, such as, polymer films, magnetic recording tapes, paints, among others, are not always economically attractive or reliable. For example, electroconductive compositions, e.g., powders known as ECPs, which are currently available for use as conductive pigments in paint are not completely effective. Carbon black can be used to impart electroconductivity, but this can limit the color of a paint to black, dark gray and closely related shades. Conventional antimony-doped tin oxide powders may be used as an ECP, but the quantities required may result in unfavorable cost and color limitations.

An electroconductive composition which comprises antimony-containing tin oxide wherein the tin oxide is predominantly crystalline, and the composition is associated with silica or a silica-containing material, e.g., a silicate, is described in European Patent Application Publication No. 0359569, which published on Mar. 21, 1990, and is entitled "IMPROVED ELECTROCONDUCTIVE COMPOSITION AND PROCESS OF PREPARATION" (hereinafter referred to as "EPO '569"). The entire content of EPO '569 is hereby incorporated by reference. The antimony-containing tin oxide forms a two-dimensional network of densely packed crystallites upon the surface of the silica or a silica-containing material. The silica or silica containing material is a powder comprising shaped particles of amorphous silica, inert core particles coated with amorphous silica or hollow shells composed of amorphous silica. In the process used to prepare this electroconductive composition, the silica is first deposited as a coating upon core particles, which are in an aqueous suspension; optionally the core particles may then be dissolved, and the antimony-containing tin oxide layer is deposited on the silica surface as an additional step in the process.

SUMMARY OF THE INVENTION

The present invention relates to a electroconductive material or powder (ECP), which comprises fine crystallites that are composed of an intimate mixture of silica, e.g., $SiO_2$, and antimony-containing tin oxide, e.g., $SnO_2(Sb)$. The invention also relates to a coprecipitation process for obtaining the ECP crystallites.

In contrast to conventional ECPs, the electroconductive antimony-containing tin oxide crystallites of the invention are intimately mixed with silica, whereas conventional compositions are deposited upon a silica surface. The presence of silica as a component of the composition of the invention reduces grain growth of the crystallites during precipitation and/or calcination, thereby forming very fine crystallites.

It is known from conventional processes that the crystallite size can be decreased by increasing the antimony content. However, to obtain crystallites having an average diameter of 100 Angstroms conventional practice requires an antimony content of at least 10 wt %. At such a concentration of antimony, a strong blue grey color develops, which is detrimental in many applications, e.g., imaging papers, among others. In contrast, the present invention employs an effective amount of silica which reduces crystallite grain growth, and forms fine crystallites, thereby avoiding using a quantity of antimony which develops a blue color.

In comparison to conventional processes, the process of the invention requires fewer steps, and the invention can be conducted more rapidly, particularly when in the presence of a promoter cation.

The electroconductive powders of the invention when formulated with appropriate binders and additives may be applied to a variety of surfaces to impart electrical conductivity and antistatic properties. For example, electro-conductive powders of the invention can be used to impart electroconductive properties to coatings or thin films which are useful in a variety of applications requiring surface conductivity or static electric charge dissipation. When formulated with appropriate binders and additives these ECPs are useful for coating glass, paper, corrugated boxboard, plastic film or in sheet such as polycarbonate, polyester and polyacrylate, electroconductive paint coatings, among many others.

DETAILED DESCRIPTION OF THE INVENTION

Figure 1:
FIG. 1 is a photomicrograph at 3×130 Kx magnification of the ECP formed in accordance with Example 4.

The present invention relates to an electroconductive powder (ECP) comprising fine crystallites, composed of intimately mixed silica, e.g., $SiO_2$, and an antimony-containing tin oxide, e.g., $SnO_2(Sb)$. The average size of the crystallites is less than about 100 Angstroms. The ECP typically is in the form of a powder, the particles of which are composed of agglomerated crystallites, wherein the agglomerates range in size from sub-micron to tens of microns. The crystallites normally comprise about 1 to 20 wt % $SiO_2$ and 80 to 99 wt % $SnO_2(Sb)$. The Sb component within the $SnO_2$ typically ranges from about 0.5 to 12.5%. The crystallites may also contain traces, e.g., less than 0.1%, of metal cations.

An aspect of the invention relates to a process for preparing the above composition. The process comprises coprecipitating in an aqueous media an intimate mixture of $SiO_2$, $SnO_2$ and $Sb_2O_3$. The process is optionally conducted in the presence of one or more metal cations while maintaining the pH in the range of about 1.0 to 3.0 with a 20% sodium hydroxide solution. The precipitated solids are recovered, washed with water until substantially free from soluble residues, and calcined to form an electroconductive powder.

Whenever used in the specification and appended claims the terms below are intended to have the following definitions.

"Amorphous silica" as used herein refers to a phase which is intimately mixed, interdispersed around and/or within the antimony-containing tin oxide, e.g., hydrous antimony-containing tin oxide. Amorphous silica also includes materials which contain silica that do not adversely affect the desired properties of the antimony-containing tin oxide. The morphology of the silica is predominantly amorphous or lacking any long-range crystalline structure.

"Antimony-containing tin oxide" as used herein refers to an electrically conductive portion of a crystallite. The morphology of the crystallites corresponds generally to the structure of tin oxide. At least a portion of the tin within the crystalline lattice or matrix of the tin oxide has been substituted with antimony, thereby causing the crystallites to become electrically conductive. While antimony oxide may be present on an atomic level, significant quantities of antimony oxide are normally not detectable in the ECP.

As the quantity of antimony within the tin oxide crystallite increase, the resistivity of the finished dry ECP decreases, i.e., the conductivity increases. Generally, the antimony content of the crystallite can range from about 1 to 30% by weight, but desirable properties can be obtained when the antimony content is from 3–10% antimony by weight, e.g., when the ECP is employed for static dissapation.

"Intimate mixture of amorphous silica" as used herein refers to the manner in which silica becomes associated with the antimony-containing tin oxide. The silica becomes associated with the antimony containing tin oxide by coprecipitation.

The composition of the invention is an electroconductive powder (ECP), which comprises agglomerates of fine crystallites that are composed of silica, e.g., $SiO_2$, and antimony-containing tin oxide, e.g., $SnO_2(Sb)$. The crystallites typically comprise about 1 to 20% $SiO_2$, and about 80 to 99% $SnO_2(Sb)$. The Sb component of the $SnO_2$ normally ranges from about 1 to 12.5% by weight. The crystallites may also contain traces, usually less than 0.1% by weight, of metal cations. The metal cations can include one or more metals selected from the group of alkali metals, alkaline earth metals, transition metals, rare earth metals, among others.

The crystallites are essentially iso-dimensional, and have an average diameter between about 30 and 100 Angstroms; normally between about 50 and 70 Angstroms, i.e., as measured by X-ray diffraction line broadening. The agglomerates of silica and the conducting tin oxide typically range in the size from submicrons to tens of microns.

The relatively small size of the crystallites and agglomerates thereof is a desirable property. Particularly, the efficacy of the powder for producing electroconductive coatings, e.g., transparent films, is enhanced as a result of the crystallite size. The crystallite size can be decreased by increasing the antimony content. In a conventional process for producing powders which have an average diameter of about 100 Angstroms, the antimony content is at least about 10 wt %. However, as the antimony content is increased color develops, and at about 10 wt % Sb, conventional powders exhibit a strong blue grey color. Exhibition of color is detrimental in many applications such as imaging papers. In contrast, the ECP composition of the invention, which is composed of an intimate mixture of silica with an antimony containing tin oxide, unexpectedly produces crystallites which are highly electroconductive at Sb concentrations that are below the level at which color is apparent. It was surprising that the crystallites of the invention are smaller than would have been expected given the relatively low concentration of antimony. The relatively small size of the crystallites is confirmed by the relatively high surface area of the powder, i.e., as measured by nitrogen absorption the powder has a surface area between about 20 and 200 $M^2/g$, and normally between about 100 and 150 $M^2/g$. As a result, the powder of the invention is a particularly desirable component of a transparent electroconductive coating, film, layer, among others.

A composition of the invention is prepared by a process which generally comprises:

(a) mixing an alkali silicate solution, and a solution of Sn4+ and Sb3+ salts under conditions which result in the precipitation of a composition comprising intimately mixed silica, and hydrous oxides of tin and antimony;

(b) recovering the precipitated solids, washing the solids substantially free of water soluble residues and drying; and (c) calcining to form a powder comprising agglomerates of fine crystallites composed of an intimate mixture of amorphous silica, e.g., $SiO_2$, and an antimony-containing tin oxide, e.g., $[SnO_2(Sb)]$.

While any suitable silicate solution can be employed, the alkali silicate solution typically comprises sodium silicate and/or potassium silicate. A convenient form of silicate is a clear aqueous solution which has a $SiO_2/Na_2O$ or $SiO_2/K_2O$ molar ratio of about 3.25/1, and an $SiO_2$ content of about 26.5 wt %, that has been filtered to substantially remove any insoluble material.

Tetravalent tin salts are normally used for performing the process of the invention. A tin salt solution may conveniently be prepared by dissolving $SnCl_4 \cdot 5H_2O$ in water. While tin chloride is typically used, other water soluble salts, such as sulfates, nitrates, oxalates, acetates, among others, can be employed as a source of tin.

Trivalent antimony salts are normally used for performing the process of the invention. A chloride antimony salt is most commonly used, and a solution can be prepared by dissolving $SbCl_3$ in nominal 37% HCl. As in the case of the tin salts chloride is typically used, but other salts such as, sulfates, nitrates, oxalates, acetates, among others, can be employed as a source of antimony. While the solutions of tin and antimony salts may be added concurrently, it is usually more convenient to first mix the salt solutions together and add them as a combined solution. Although the concentration of the salts in solution is not a critical aspect of the invention, it is expedient for the concentrations to range between about 50 to 500 g of $SnO_2/l$, and about 0.5 to 300 g $Sb/l$.

It is advantageous to mix the alkali silicate, and tin and antimony solutions in the presence of one or more cations selected from the group comprising alkali metals, alkaline earth metals, transition metals, rare earth metals, among others. Such cations are typically introduced as soluble salts, such as, chlorides, nitrates, sulfates, among others. Group IIA metals are advantageous for this purpose with calcium and barium being particularly effective. Without wishing to be bound by any theory or explanation, it is believed that the cations function as promoters for the codeposition of an antimony containing tin oxide when in the presence of silica. For example, when in the presence of certain cations the deposition or precipitation reaction is relatively fast; or in other words, the process can be conducted virtually as rapidly as the reactants can be mixed. It is believed that in a pH range of about 1.0 to 3.0 a metal cation such as $Ca^{++}$ displaces protons from hydroxylated silica OH groups, and that the metal cation is then rapidly substituted by Sn4+ and/or Sb3+. At a higher pH, e.g., above 5, the OH groups are not readily converted, and the substitution by Sn4+ and/or Sb3+ occurs more slowly.

The cations are conveniently introduced by first preparing a continuously agitated aqueous solution, which has a concentration of promoter cations between about 0.1 and 3.0M; most commonly between 1.0 and 2.0M. The solutions of alkali silicate, tin and antimony salts are metered into this agitated solution while maintaining the pH in the range of about 1.0 to 3.0. This pH is maintained in such a range by adding a 20% sodium hydroxide solution, as needed. The solutions are mixed at a temperature between about 25° and 100° C. The resulting suspension is continuously agitated for about one hour; normally about half an hour, at a pH between 1.0 and 3.0, and at a temperature between 25° and 100° C. to assure that the system is fully stabilized. While any suitable means can be used to agitate the suspension, it is desirable to use a stirring paddle.

The solids, which precipitate out from the suspension, are isolated by any convenient solid liquid separation procedure, such as vacuum filtration. The isolated solids are normally then washed with deionized water until substantially free from soluble residues, e.g., in the manner described in EPO '569; the teachings of which have been incorporated by reference. The isolated and washed solids can be dried at about 120° to 150° C., usually in an air oven. By drying the solids, hydrous oxides of tin and antimony are converted to an antimony containing tin oxide. However, a separate drying step is unnecessary when the washed solids are to be calcined immediately following isolating and washing.

The solids are next calcined in an oxygen-containing atmosphere, e.g., air, at a temperature in the range of about 500° to 900° C. for a period of time sufficient to develop the appropriate crystallinity of the intimately mixed $SiO_2[SnO_2(Sb)]$ phases, and establish the desired conductivity. The necessary calcination time will depend on the temperature and geometry of the furnace. In a small batch furnace, for example, the time required for calcination is typically from about 1 to 2 hours. Calcination is a key aspect of the process of the invention because calcination results in the development of the electroconductive crystalline phase of an antimony-containing tin oxide. The presence of intimately mixed silica within an antimony containing tin oxide inhibits crystal growth during calcination, thereby resulting in fine crystallites, e.g., about 70 angtroms. Calcination may be employed as one or more steps in order to tailor or modify the conductivity of the crystallites, e.g., a previously calcined powder can be further calcined for increasing the conductivity of the crystallites.

In one aspect of the invention, the configuration or dimensions of the calcined powder may be modified or tailored by micronizing. Any suitable process for micronizing such as a conventional jet mill, among others, may be employed to practice this aspect of the invention. When calcined powders are micronized, the average particle size typically ranges from about 1 to 10 microns. For example, a calcined powder may be micronized to reduce the average size of the powder, thereby increasing the transparency and dispersibility of the powder. By increasing the transparency of the powder, the powder can be incorporated into a carrier matrix such as an acrylic in order to form a transparent conductive film. Moreover, micronized powders can be used to coat relatively large particles or shells, e.g., colored toners.

The dry powder electrical resistance is an important property of the ECPs. The electroconductivity of the powder is inversely related to the resistivity, and it is desirable that the dry powder electrical resistance be as low as possible so that the powder is effective when incorporated into electroconductive coatings, films, among others. Generally, the lower the relative resistance of the dry powder, the greater the powder's conductance in a particular end-use application. However many other factors, for example, the ability to form an interconnecting network in the end-use carrier matrix or binder system, may also affect end-use. An ECP powder of the invention is typically characterized by a resistivity less than about 2000 ohm-cm, and normally between 1 and 100 ohm-cm.

A powder resistance test was performed with a cylindrical cell and a Carver laboratory press. The cell was constructed with brass electrodes at the top and bottom, that fit snugly inside a cylindrical piece of plastic having an internal diameter of about 3 centimeters. Copper leads were attached to the brass electrodes, and connected to an ohm meter. With the bottom electrode in position a sample of powder was introduced into the plastic cylinder and the top electrode was placed into position above the powder. The height of the powder should be about 2.0 cm before exerting any pressure. Using the Carver laboratory press, the powder sample was compressed between the upper face of the bottom electrode and the lower face of the top electrode. The height and electrical resistivity of the powder is then measured; the latter with an ohm meter. The measurement of height and resistance are repeated at compressions of 250, 1000, 2000, 4000, 6000, 8000 and 10,000 psi.

The value of the powder resistance, for a given compression was obtained, by the following calculation:

Resistivity, P=(Resistance×Area)/Height

Resistance is measured in ohms, and cross-sectional area of the cylinder in square centimeters. Height is the length of the powder column between the top and bottom electrodes in centimeters. In the case of the cell used in the following examples the area was about 7.07 square centimeters.

The effectiveness of the present composition in imparting electroconductive properties to a coating was ascertained by dispersing the powder into an aqueous vehicle, casting a coating onto a glass plate, drying and measuring the Surface Resistivity (S.R.). The powder dispersion was coated onto a glass plate by hand, using a coating knife, which was adjusted to give the desired glass coating thickness. The surface loading of powder was determined by weighing the glass plates before and after coating, then multiplying the weight difference by the percentage of powder in the dispersion, and dividing by the area coated. The surface loading was expressed in pounds per 1000 square feet of surface, (lbs/Kft2). The surface resistivity of the coating is measured using a Dr. Thiedig Milli-to-2 current/resistance meter, manufactured by Monroe Electronics, Lyndonville, N.Y. This instrument gives a direct reading in ohms per square. The lower the value for S.R. the greater the electroconductivity.

The electroconductive material of this invention and its method of preparation are illustrated in more detail in the following examples which should not be construed as limiting the scope of the appended claims. Unless stated to the contrary, % composition is on a weight percentage basis.

EXAMPLE 1

This example describes the preparation of an ECP composition comprising antimony-containing tin oxide and silica, the weight ratio of $SnO_2$ to Sb being about 10.6 to 1. The silica content of the ECP is about 7.5%.

About 2.5 liters of de-ionized water were heated to about 80° C. and a stirred within a four liter beaker. A solution comprising about 20% HCl was added to the heated water in order to adjust the pH to about 2.0. Approximately 220 grams of $CaCl_2$ pellets were then dissolved in the acidic solution.

Next, an aqueous solution of $SnCl_4$, $SbCl_3$ and HCl was prepared by combining about 222 ml. of $SnCl_4$ solution, which contained the equivalent of about 0.445 g $SnO_2$/ml, with about 42 ml of concentrated HCl solution which contained an amount of $SbCl_3$, that was equivalent to about 0.267 g Sb/ml. The resultant solution possessed about 9 parts of $SnO_2$ to 1 part of Sb.

An aqueous solution of potassium silicate was prepared by dissolving about 40 grams of a stock solution, which comprised $K_2SiO_3$ and had an $SiO_2/K_2O$ molar ratio of about 3.29 that contained about 26.5 wt % $SiO_2$, into about 600 ml of 20% NaOH.

Over a period of about two hours the $SnCl_3/SbCl_4/HCl$ solution was stirred into a $CaCl_2$ solution, concurrently with the controlled addition of the $K_2SiO_3$ solution. During the solution additions, the pH was maintained at about 2.0, and the temperature at about 80° C. A product precipitated which was retained in suspension by continuous agitation using a paddle stirrer. The precipitated product was cured, e.g., to assure that the system is fully stabilized, by stirring for about one half an hour while maintaining a pH of about 2.0 and a temperature of about 80° C.

The product or solid was recovered by filtration, washed with deionized water until substantially free from chloride ions, and dried by heating at about 120° C. for several hours. The dried powder was calcined in air at about 750° C. for about 2 hours. Approximately 128 grams of an off-white powder was obtained. The powder was examined by using x-ray diffraction analysis which determined that the major crystalline phase had a broad peak pattern which corresponded to $SnO_2$. The pattern was used to calculate the average crystallite size which was about 53 Angstroms. The powder was further examined by using X-ray fluorescence analysis which determined that the powder contained about 81.36% $SnO_2$; 9.40% Sb2O3 and 7.56% $SiO_2$. The Sb component of the SnO2 was about 8.65%. The surface area as measured by nitrogen absorption was about 98 m²/g, and the dry powder electrical resistance was about 3.5 ohm-cm.

EXAMPLE 2

This Example illustrates the effects of increasing the quantity of silica which is used to precipitate the powder.

The process used in this Example was substantially identical to that described in Example 1 with the difference being that the amount of aqueous potassium silicate used was increased from about 40 grams to 200 grams.

The process obtained about 176 grams of an off-white powder. The powder was examined by using X-ray diffraction analysis which determined that the major crystalline phase corresponded to a broad peak pattern for $SnO_2$. The pattern was also used to determine the average crystallite size which was about 35 Angstroms. The powder was further examined by X-ray fluorescence analysis which determined that the powder contained about 58.65% SnO2; 6.92% Sb2O3 and 30.86% SiO2. The Sb component corresponded to about 9% of the $SnO_2$. The surface area of the powder which was measured by nitrogen absorption, was about 171.5 m²/g, and the dry powder electrical resistance was about $2.93 \times 10^4$ ohm-cm.

The results of this Example indicate that addition of a relatively large amount of $SiO_2$ achieves a smaller average crystallite size, and a higher surface area. However, the presence of such a level of silica adversely affected the dry powder electrical conductivity.

EXAMPLE 3

This Example illustrates the effects of omitting the silica and calcium salts.

About 2.5 liters of de-ionized water were heated to about 80° C., and stirred in 4 liter beaker. Approximately 264 ml of a $SnCl_4/SbCl_3$ solution was prepared substantially in accordance with Example 1, and was added over a period of about two hours to the heated water. Concurrent with the addition of the tin and antimony salts, a 20% NaOH solution was added as necessary in order to maintain the pH at about 2.0. The temperature was maintained about 80° C. throughout this Example.

A precipitated product was retained in suspension by continuously agitating the beaker. The suspension was cured by stirring for about half an hour while maintaining the pH at about 2.0, and the temperature at about 80° C.

A dry calcined product was produced and recovered substantially in the manner described in example 1. Approximately 115 grams of an off-white powder was obtained. The powder was examined by X-ray diffraction analysis which determined that the major crystalline phase corresponded to a broad peak pattern for $SnO_2$. The X-ray pattern was also used to determine the average crystallite size of the powder which was about 88 Angstroms. The powder was examined further by X-ray fluorescence analysis which indicated that the powder contained about 89.54% SnO2; 10.41% Sb2O3 and less than about 0.08% SiO2. The Sb component of the SnO2 was about 8.61%. The surface area which was measured by nitrogen absorption, was about 35 m²/g, and the dry powder electrical resistance was about 0.5 ohm-cm.

The results of this Example indicate that in the absence of $SiO_2$, and at an equivalent Sb level, the average crystallite size increases and the surface area decreases.

EXAMPLE 4

This Example illustrates the affects of the presence of a promoter cation.

The process used in this Example was substantially identical to that described in Example 1 except that calcium chloride was not present during the precipitation.

After calcining, about 126 grams of an off-white powder was obtained. The product was examined by X-ray diffraction analysis which determined that the major crystalline phase corresponded to a broad peak pattern for $SnO_2$. The pattern was also used to determine the average crystallite size which was about 48 Angstroms. The powder was further examined by X-ray fluorescence analysis which determined that the powder contained about 81.92% SnO2; 9.80% $Sb_2O_3$ and 7.54% SiO2. The Sb component of the $SnO_2$ was about 8.92%. The surface area as measured by nitrogen absorption was about 121 m²/g, and the dry powder electrical resistance was about 13.3 ohm-cm.

Referring now to the Figure, FIG. 1 is a photomicrograph at 3×130 Kx magnification of the powder which was formed in accordance with this Example.

EXAMPLE 5

This Example was performed substantially in accordance Example 1 with the exception being that about 100 grams of $CaCl_2$ pellets are dissolved into the acidic solution of $SbCl_4$ and $SbCl_3$; instead of dissolving the $CaCl_2$ pellets into the initial aqueous HCl solution.

The process produced about 125 grams of an off-white powder. The powder was examined by X-ray diffraction analysis which determined that the major crystalline phase corresponded to a broad peak pattern for $SnO_2$. The pattern was also used to determine the average crystallite size which was about 49 Angstroms. The powder was further examined by X-ray fluorescence analysis which determined that the powder contained about 80.14% SnO2; 9.48% $Sb_2O_3$ and 6.99% SiO2. The Sb component of the SnO2 was about 8.83% by weight. The surface area as measured by nitrogen absorption was about 109.6 $m^2/g$, and the dry powder electrical resistance was about 7.0 ohm-cm.

The results of this Example indicate that the invention can produce a desirable ECP by introducing a promoter cation into the solution of tin and antimony salts.

EXAMPLE 6

This Example was performed substantially in accordance with Example 1 with the exception being that the precipitation step of the process was conducted at about 40° to 45° C.

This process obtained about 130 grams of an off-white powder. The powder was examined by X-ray diffraction analysis which indicated that the major crystalline phase corresponded to a broad peak pattern for $SnO_2$. The pattern was also used to determine the average crystallite size which was about 39 Angstroms. The powder was further examined by X-ray fluorescence analysis which indicated that the powder contained about 80.44% SnO2; 9.82% Sb2O3 and 8.35% SiO2. The Sb component of the $SnO_2$ was about 9.08%. The surface area of the powder, as measured by nitrogen absorption, was about 103.1 $m^2/g$, and the dry powder electrical resistance was about 14.1 ohm-cm.

The results of this Example indicate that the lower reaction temperature caused formation of a small average crystallite size while avoiding adversely affecting the dry powder electrical resistance.

COMPARATIVE EXAMPLE 7

This Example comprises an electroconductive coating utilizing an ECP of the present invention, and a composition made by the process described in European Patent Application Publication No. 0359569 (hereinafter "EPO '569"), the entire content of which is hereby incorporated by reference. The procedure of present Example 1 was used to prepare an ECP powder. The powder was first hammer-milled using a Mikro Pulverizer from Hosokawa Micron International, Inc., Summit, N.J. The powder was then fed through a funnel, and into a chamber that contains a set of revolving hammers. The hammers pulverize and push the powder through a metal screen. The screen contains rectangular slits, arranged in a herringbone pattern. Each slit is approximately one-half inch in length, and one-thirty second of an inch in width. About 200 grams of the pulverized and screened powder was dispersed using a Hockmeyer high speed disperser into about 444 grams of High Temperature Varnish SS-10541, (a product of Werneke-Long, Inc., Tinley Park, Ill.), and 356 grams of a high viscosity aqueous solution containing about 10 grams of hydroxyethyl cellulose, (Natrosol- 250HR from Aqualon Company, Hopewell, Va.) in two liters of water. The high speed disperser was operated for a period of about 15 minutes, at 3000 r.p.m. using a 1½" blade so as to thoroughly disperse the powder into the aqueous matrix or vehicle. The dispersed powder was then diluted by the addition of more aqueous hydroxyethyl cellulose so that the concentration of powder became about 7.5%.

Four samples of the 7.5% dispersion were further diluted to give a series of dispersions ranging in powder concentration from about 1 to 4.0%. The diluted samples were used for forming coatings on glass plates, and the surface resistance of the coatings was then measured. The measured surface resistance at the different powder dilutions or loadings is listed in Table 1.

TABLE 1

| % EXAMPLE 1 | Powder lbs/Kft2 | S.R. ohms/square |
| --- | --- | --- |
| 1 | 0.21 | >$10^{12}$ |
| 1.5 | 0.28 | $1 \times 10^8$ |
| 2 | 0.40 | $1 \times 10^7$ |
| 3 | 0.59 | $1 \times 10^6$ |
| 4 | 0.93 | $2 \times 10^5$ |

An electroconductive powder, which is marketed by the Du Pont Company under the trademark ECP-S, was prepared substantially as described in Example 1 of EPO '569. ECP-S comprises a silica shell which includes a two-dimensional network of antimony-containing tin oxide upon the surface of the shell. The powder of EPO '569 was first hammer-milled in the manner described above, and an approximately 250 gram sample was dispersed into about 500 grams of HTV, and about 250 grams of high viscosity aqueous hydroxyethyl cellulose, (0.5%), in the manner described above. A series of diluted samples ranging in powder concentration from about 1 to 5% was prepared as before, and used to form coatings on glass plates. The measured surface resistance at the different powder loading is listed in Table 2.

TABLE 2

| % ECP-S | Powder lbs/Kft2 | S.R. ohms/square |
| --- | --- | --- |
| 1 | 0.22 | >$10^{12}$ |
| 2 | 0.39 | $10^9$ to $10^{10}$ |
| 2.5 | 0.54 | $2 \times 10^7$ |
| 3 | 0.60 | $3 \times 10^6$ |
| 4 | 0.92 | $1 \times 10^5$ |
| 5 | 1.09 | $8 \times 10^4$ |

The results listed in Tables 1 and 2 indicate a very similar efficiency-in-use for the two powders. However, the powders of the present invention overcome the need for a silica shell, and the attendant process steps to obtain the shell. Moreover, the off-white or generally transparent powders of the present invention also possess a desirable small crystallite size, while avoiding the presence of large quantities of antimony.

While certain aspects and embodiments of the invention have been described in detail, one of ordinary skill would recognize that other embodiments and variations are encompassed by the appended claims.

The following is claimed:

1. A process for preparing an electroconductive powder, which comprises the steps of:

(a) contacting an aqueous alkali silicate solution with at least one solution which comprises tin and antimony salts, optionally in the presence of a Group IIA metal cation, and while maintaining the pH at about 2.0 or less, and the temperature in the range of about 25° to 100° C., (b) recovering a precipitate which comprises silica and hydrous oxides of tin and antimony, washing and drying the precipitate; and (c) calcining the dried precipitate at a temperature of about 500° to 900° C., thereby obtaining an electroconductive powder comprising silica and an antimony-containing tin oxide.

2. A process for obtaining an electroconductive powder comprising the steps of:

(a) concurrently contacting at least one aqueous solution which comprises an alkali silicate with at least one other solution which comprises tin and antimony salts, optionally performing said contacting in the presence of at least one member selected from the group consisting of Group IIA metal cations, alkali metals, alkaline earth metals, transition metals and rare earth metals, (b) controlling the pH to be at about 2.0 or less and temperature such that a precipitate is formed which comprises silica and hydrous oxides of tin and antimony, (c) heating the precipitate for a time and at a temperature sufficient to obtain an electroconductive powder comprising a mixture of silica and an antimony-containing tin oxide.

3. The process of claim 1 or 2, wherein the quantity of silicate is sufficient to inhibit grain growth and less than about 20 wt %.

4. The process of claim 1 or 2, wherein said Group IIA metal cation comprises at least one of barium and calcium.

5. The process of claim 1 or 2 wherein said tin and antimony salts comprise at least one of chlorides, sulfates, nitrates, oxalates, and acetates.

6. The process of claim 1 or 2 wherein said silicate comprises at least one of sodium silicate and potassium silicate.

7. The process of claim 3, wherein the quantity of silicate ranges from about 1 to 20 wt % and said electroconductive powder comprises crystallites which have an average diameter no greater than about 100 Angstroms.

8. The process of claim 1 or 2, further comprising reducing the dimensions of said electroconductive powder.

9. The process of claim 7 wherein the electroconductive powder comprises agglomerates which comprise an intimate mixture of antimony-containing tin oxide crystallites and silica, said mixture comprising about 1 to 20 wt % silica, about 80 to 99 wt % of an antimony-containing tin oxide, and wherein the antimony component of the tin oxide being between about 0.5 and 12.5 wt %.

10. The process of claim 1 or 2, wherein said powder has a resistivity of less than 2,000 ohm-cm.

11. The process of claim 1 or 2, wherein said powder has a surface area between about 20 to 200 $m^2/g$.

12. The process of claim 1 or 2, wherein the antimony content of said powder is less than about 10% by weight.

13. The process of claim 1, 2, 3, or 7 wherein the powder comprises about 1 to 20% by weight silica.

14. The process of claim 4, wherein said contacting is in the presence of calcium chloride.

* * * * *